April 8, 1930. F. W. ANDREWS 1,753,190
AUTOMATIC ELECTRIC HEATING APPARATUS
Filed March 18, 1929   2 Sheets-Sheet 2

INVENTOR
Frank W. Andrews.
BY
Lawrence S. Paddock
ATTORNEY

Patented Apr. 8, 1930

1,753,190

UNITED STATES PATENT OFFICE

FRANK W. ANDREWS, OF FORT WAYNE, INDIANA

AUTOMATIC ELECTRIC-HEATING APPARATUS

Application filed March 18, 1929. Serial No. 347,938.

This invention relates to an automatic electric heating apparatus of the general nature of that described in my co-pending application, Serial No. 325,375, filed December 11, 1928.

Among its object is the production of an efficient, economical automatic means for producing, storing, transmitting and distributing heat to the place which it is desired to heat.

A further object is to so confine and insulate the heat produced that the maximum amount of heat is transmitted to the place which it is desired to heat.

A further object is to control the temperature at the point of heating by an automatic means responsive to the temperature of the heating means.

A further object is to control the volume of the heat transmitting medium delivered to the place to be heated by an automatic means responsive to the temperature of the place to be heated.

A further object is to control the volume of heat transmitting medium delivered to the place to be heated by suitable volume controlling means at the delivery end of the heating means.

Another object is to properly humidify the air when it is used as a heat transmitting medium.

A further object is to control the time factor of heat application to the heating means so that the most economical heating is effected.

A further object is to produce a heating system which will be compact, cheap to manufacture and will operate at a minimum of cost.

A further object is to produce a heating and control of the system by electrical means.

A further object is to provide an improved structure in which the amount of heating surface between the heating medium and the heat transmitting medium is greatly increased.

A further object is to provide an improved structure in which the heat transmitting medium is brought in contact with the heat retaining or storing medium both externally and internally thereof.

Figure 1:
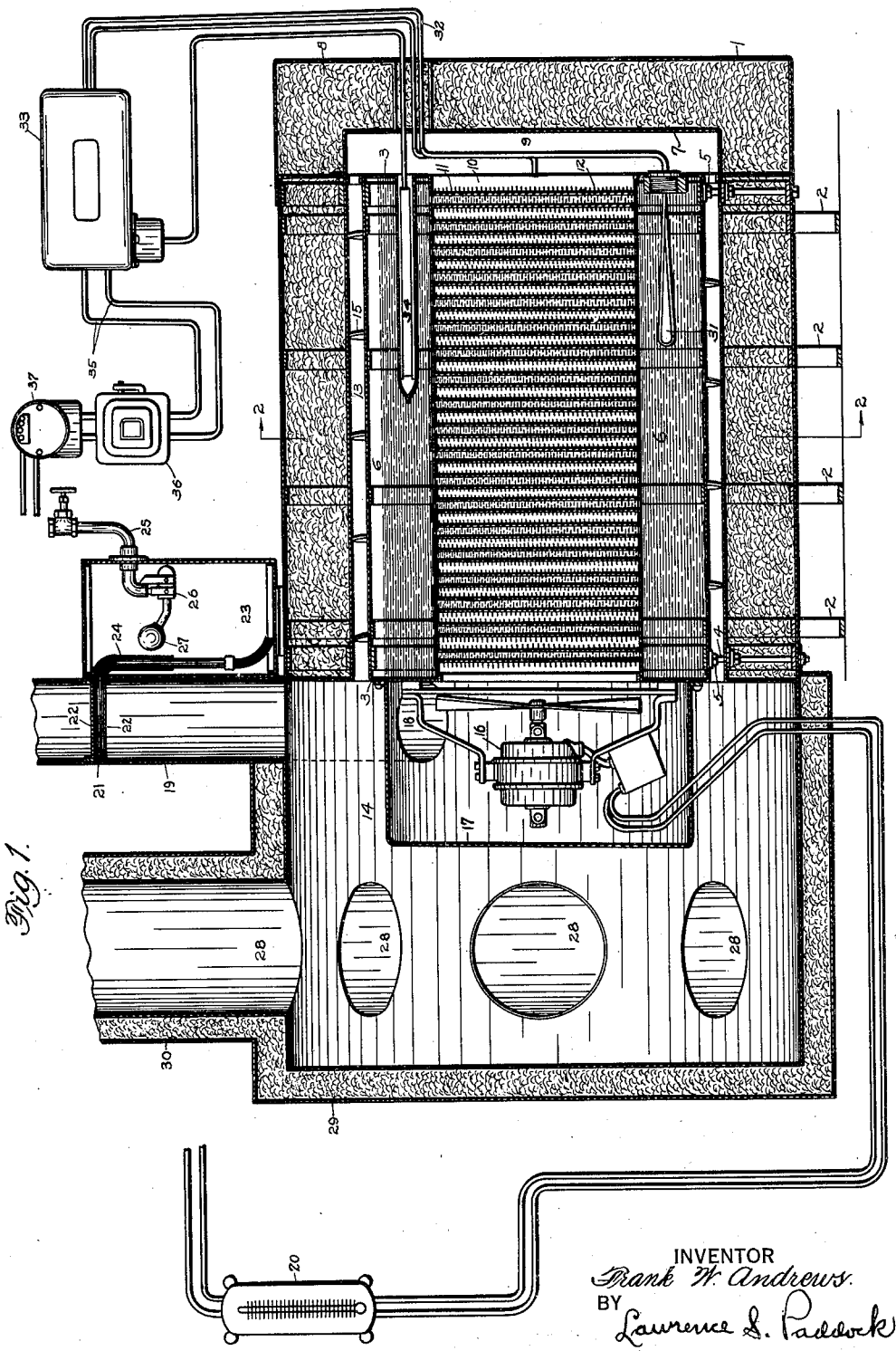
Figure 1 is a side elevation partly in section of the apparatus.

In the drawing 1 is the outer casing of the heating means and rests upon supports 2. A receptacle 3 is held within the casing 1 by supports 4 consisting of threaded bolts and nuts as shown fitted with saddles 5. The receptacle 3 is supplied with a heat absorbing fluid 6. In the preferable form this heat absorbing fluid or solution consists of 50% chemically pure glycerine and 50% distilled water, thoroughly mixed before being placed in the solution chamber. It will be understood that I do not limit myself to these proportions of glycerine and water, but I have found such proportions as given very satisfactory. With a solution such as described the boiling point will be approximately 245° F. The specific gravity is also raised. For example, one gallon of the solution will weigh approximately 10½ lbs. as against a gallon of water which weighs 8.33 lbs. It is possible to store much more heat in such a solution than in an equivalent volume of water. I have found that over a long period of time this solution does not deteriorate, is not affected by freezing and possesses no electrolytic action when heated as chemically pure vegetable glycerine contains no salt, such as found in commercial glycerine produced by known methods from animal fat. By the use of such a glycerine-water solution a much better and greater heat storage is obtained which is very beneficial in case of a power failure of the electric current supply, which heats the electric heating elements of the heating system.

Figure 2:
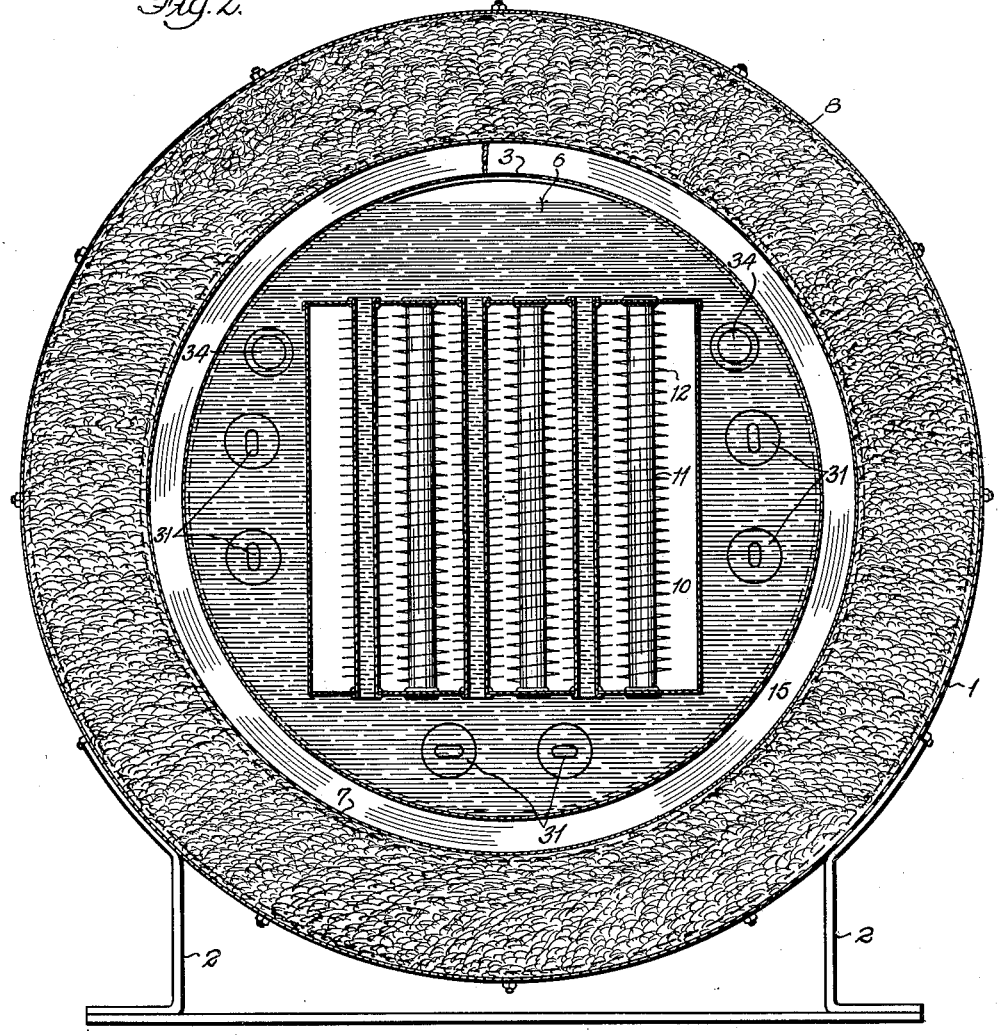
Figure 2 is an enlarged section partly in cross section taken on line 2—2 on Figure 1.

An inner casing 7, located within the outer casing 1 forms a jacket therewith which is filled with a heat insulating medium 8. The heat insulating medium which I prefer to use is known as "dry zero," but it will be understood that it is within the scope of my invention to use any other desired types of insulation. Jacket 7 is so spaced from the receptacle 3 as to leave a chamber 9 at the outer end which is in free and open communication with a central passage or tunnel 10 within the receptacle 3. Within the tunnel 10 is located a plurality of tubes 11, extending across the tunnel and in free and open communication at their ends with the chamber 3. In the embodiment of my invention herein shown these tubes are provided with radiating fins 12, and the tunnel 10 is preferably square in cross section as shown in Figure 2. The jacket 7 is so spaced from the receptacle 3 that a space is left between the jacket 7 and receptacle 3 which forms an elongated passage 13, which is connected at its outer end with the chamber 9 and at its inner end with the heat distributing chamber 14. Within the elongated passage 13 is located a spiral baffle 15. A fan 16 is located at the inner end of the tunnel 10. Surrounding the fan 16 is a cover 17 having the opening 18 therein leading to an air induction pipe 19. The electric current for driving the fan 16 is supplied through a circuit which leads to a thermostat control switch 20 which is located in the place to be heated and is responsive to the temperature of such place. The air which is drawn in through the air induction pipe 19 by the fan 16 is driven through the tunnel 10 past the tubes 11 and fins 12 which afford a large heat absorbing surface. After leaving the tunnel 10 the air then passes into the chamber 9 and from thence passes into the spiral passage 13 wherein it passes several times around the receptacle 3 before it reaches the distribution chamber 14. In this manner the heat transmitting fluid, which in the embodiment of invention herein shown is air, is subjected to a prolonged contact with receptacle 3 and also to a large heating surface including the pipes 10 with their fins 12, which results in a very efficient heat absorption.

Within the pipe 19, is located a humidifier, which acts as filter and strainer. This humidifier comprises a body of wool yarn 21, held between perforated plates 22. A water containing chamber 23 is mounted on the exterior of the pipe 19, into which projects a pipe 24, carrying a continuation of the wool yarn 21. The outer end of the wool yarn 21 is submerged within the chamber 23. The water level in the chamber 23 is maintained constant by a water supply 25 which is controlled by an automatic float controlled valve 26 located within the chamber 23, the float of which 27 is responsive to the level of the water therein. The wool yarn 21 acts as a wick and draws the water from the chamber 23 up to that portion of the yarn located between the plates 22. The air passing through the water-soaked yarn is humidified to the desired degree and the air is also filtered and cleansed. The humidifier automatically and thoroughly moistens the air, passing through the pipe 19. The air passed through the pipe 19 may be either fresh cool air or it may be air returned from the room or place which has been heated. When such a return system is used additional fresh air may be mixed with the returned air. I have found that my humidifier is exceedingly efficient. In systems heretofore used one and a half to two gallons of water are evaporated in an eight room house over a period of twenty four hours. By careful research I have found that 12 to 15 gallons of water are required to properly humidify the air in an eight room house over a period of twenty four hours to maintain a humidity of 60° to 65°, which is the amount recommended by the medical profession. My humidifier fulfills these requisites in an efficient and automatic manner. It will be understood that the position of the humidifier is not limited to being placed in the hot air discharge ducts. The water will be readily absorbed in either position and humidify the air being delivered to the room or place to be heated.

The spiral passage 13 opens at its outer end into the distribution chamber 14 from which a series of hot air pipes or ducts 28 lead to the registers in the rooms or place it is desired to heat. Automatic dampers may be placed in the hot air pipes 28 and also relay dampers to control the flow of air through these ducts to the registers.

The hot air chamber or drum 14 is heat insulated on the exterior thereof as shown at 29 and the hot air ducts or pipes 28 are heat insulated on the exterior thereof as shown at 30.

For the purpose of keeping the heat-absorbing medium 6 at the desired temperature electric heaters 31 are uniformly situated situated within the heat-absorbing medium within the chamber 3. The heaters 31 are all operated electrically through a circuit 32, which is controlled by a thermostat-controlled switch 33. Thermostats 34 are located within the heat-absorbing medium 6, which is responsive to the temperature thereof and controls the switch 33. By means of this automatic thermostat control of the heaters 31, the temperature of the heat absorbing medium 6 is kept at the desired degree. An electrical current supply 35 leads to the switch 33, which is provided with the standard square D switch 36 and an electric meter 37. The rate of flow of air through the chamber of opening 10 and also the volume of air passing therethrough is relative to the speed of the fan 16. The volume and rate of flow can also be governed by dampers in the hot air ducts and by proportioning the size of the hot ducts. The mixture or solution chamber 3 can be of any size in order to meet the demands for capacity, which capacity depends upon the amount of work or heating called upon the system to perform.

Forced air circulation has been found by heating engineers to be more efficient than natural circulation by convection. Hot air furnaces of the conventional type will develop about an ounce pressure at the registers under a 12-ft. head, but under the same conditions forced circulation such as employed by me will develop 2½ to 3 ounces of pressure at the registers. My system can be successfully operated with steam or hot water systems that are now in use.

The capacity of my system can be varied without departing from the principles thereof. In larger systems for instance of 1500 to 2000 gallons capacity of solution chamber, it is practical to use a time switch which will operate only at night, during which time enough heat will be stored to operate the system through the day. In this way a lower current cost can be obtained where special low night rates prevail.

It will thus be seen that I have provided an automatically operated electrical heating system, in which the maximum amount of heat is transmitted to the room or place to be heated and one which is clean, economical and not subject to the heat losses which are present in systems wherein a larger percentage of the heat is lost through ineffective radiation and through a chimney or stack.

Having described my invention what I claim is:

1. In an apparatus for generating and transferring heat the combination of a fluid containing receptacle having a central elongated passage therethrough, a heat-absorbing fluid in said receptacle, means for heating said heat-absorbing fluid, a plurality of tubes extending across said central passage and having open communication with said fluid in said receptacle, means for passing a heat-absorbing fluid through said passage in said receptacle, a means for conducting said heat-absorbing fluid thus passed to a place to be heated.

2. In an apparatus for generating and transferring heat the combination of a fluid containing receptacle having a central elongated passage therethrough, a heat-absorbing fluid in said receptacle, means for heating said heat-absorbing fluid, a plurality of tubes extending across said central passage and having open communication with said fluid in said receptacle and provided with radiating fins on the exterior thereof, means for passing a heat-absorbing fluid through said passage through said receptacle, and means for conducting said heat-absorbing fluid thus passed to a place to be heated.

3. In an apparatus for generating and transferring heat, the combination of a fluid containing receptacle having a central elongated passage therethrough, a heat-absorbing fluid in said receptacle, means for heating said heat-absorbing fluid, a plurality of tubes extending across said central passage and having open communication with said fluid in said receptacle and provided with the spiral radiating fins on the exterior thereof, means for passing a heat-absorbing fluid through said passage in said receptacle, and means for conducting said heat-absorbing fluid thus passed to a place to be heated.

4. In an apparatus for generating and transferring heat the combination of a fluid containing receptacle having a central elongated passage therethrough, a casing surrounding said receptacle and spaced therefrom so as to form a chamber at the rear end thereof in open communication with said central passage in said receptacle and forming a passage between said casing and receptacle communicating with said chamber and extending to the outer end of said receptacle, a heat-absorbing fluid in said receptacle, means for heating said heat-absorbing fluid, and means for passing a second heat-absorbing fluid consecutively through said central passage, said chamber and said passage between said casing and receptacle.

5. In an apparatus for generating and transferring heat the combination of a receptacle having a central passage therethrough, a casing surrounding said receptacle and spaced therefrom so as to form a chamber at the rear end thereof in open communication with said central passage in said receptacle and forming a passage between said casing and receptacle, communicating with said chamber and extending to the outer end of said receptacle, a spiral baffle located in said passage forming with the walls thereof a continuous spiral passage, a heat-absorbing fluid in said receptacle, means for heating said heat-absorbing fluid, and means for passing a second heat-absorbing fluid consecutively through said central passage, said chamber, and said continuous spiral passage.

6. In an apparatus for generating and transferring heat, the combination of a receptacle having a central passage therethrough, a casing surrounding said receptacle and spaced therefrom so as to form a chamber at the rear end thereof in open communication with said central passage in said receptacle and forming a passage between said casing and receptacle, communicating with said chamber and extending to the outer end of said receptacle, a spiral baffle located in said passage forming a continuous spiral path of the passage between said casing and receptacle, a heat insulation surrounding said covering, a plurality of finned tubes extending across said central passage and having open communication with said receptacle, a heat-absorbing fluid and said receptacle, means for heating said heat-absorbing fluid, and means for passing a second heat-absorbing fluid consecutively through said central passage, said chamber, and said continuous spiral passage.

FRANK W. ANDREWS.